United States Patent Office 3,672,917
Patented June 27, 1972

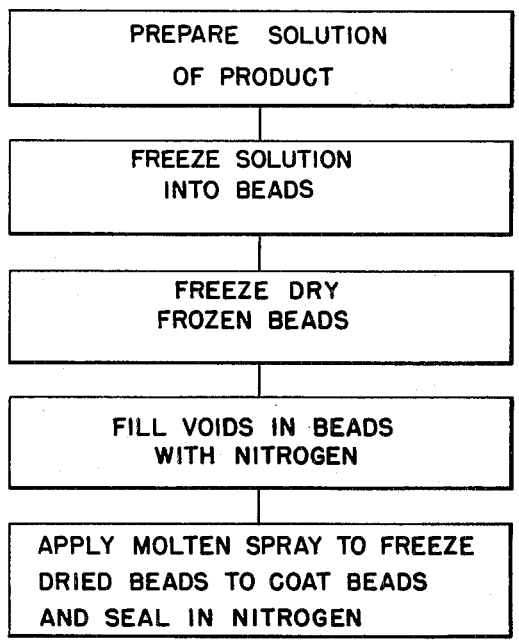
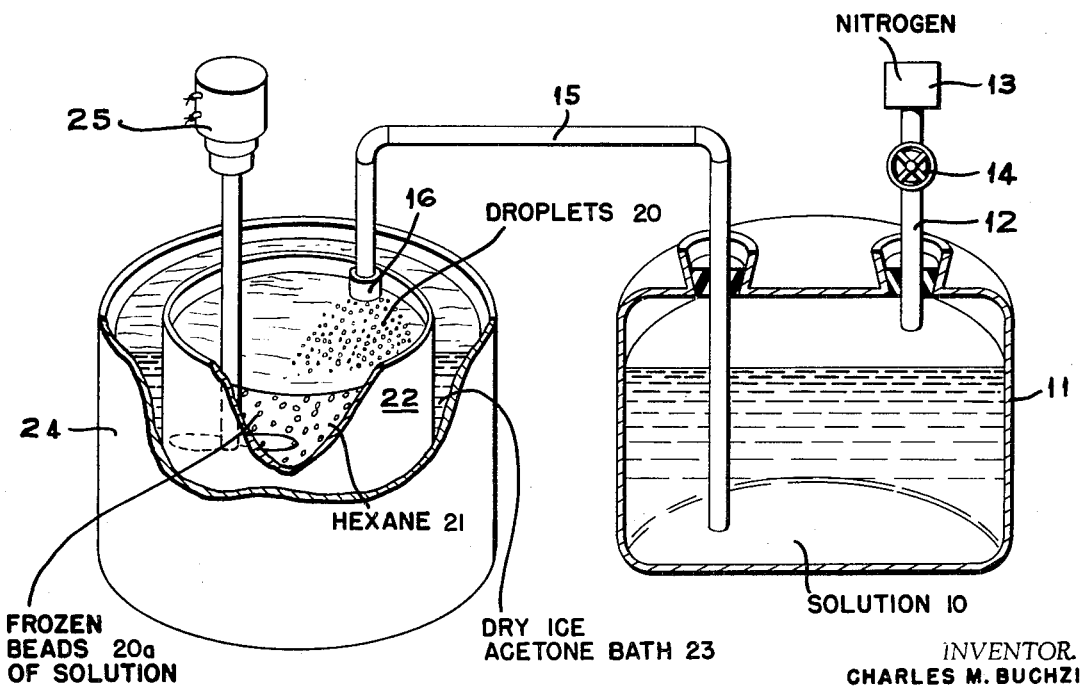

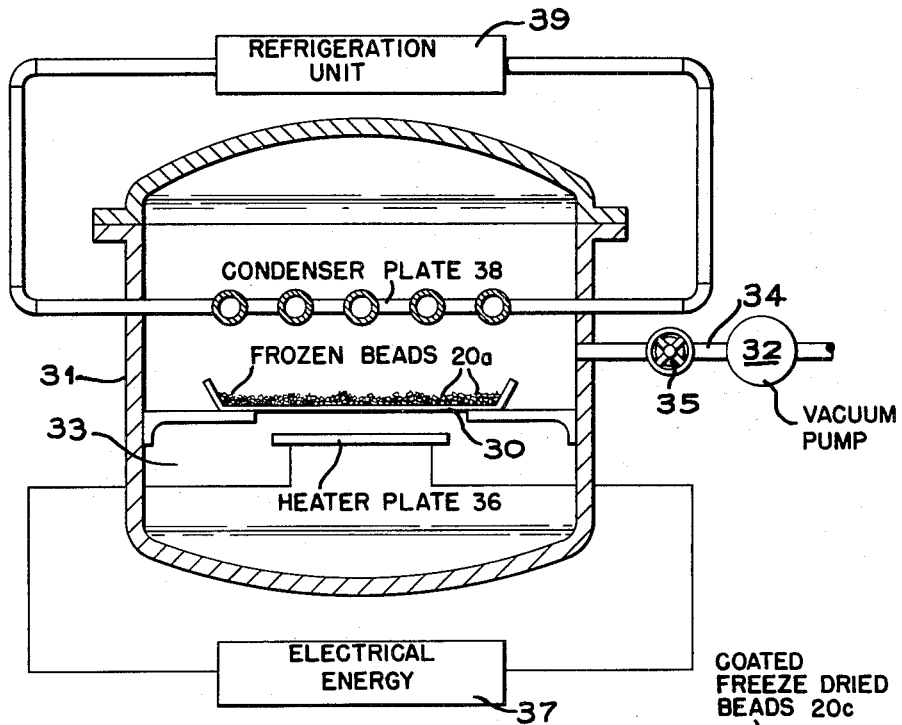
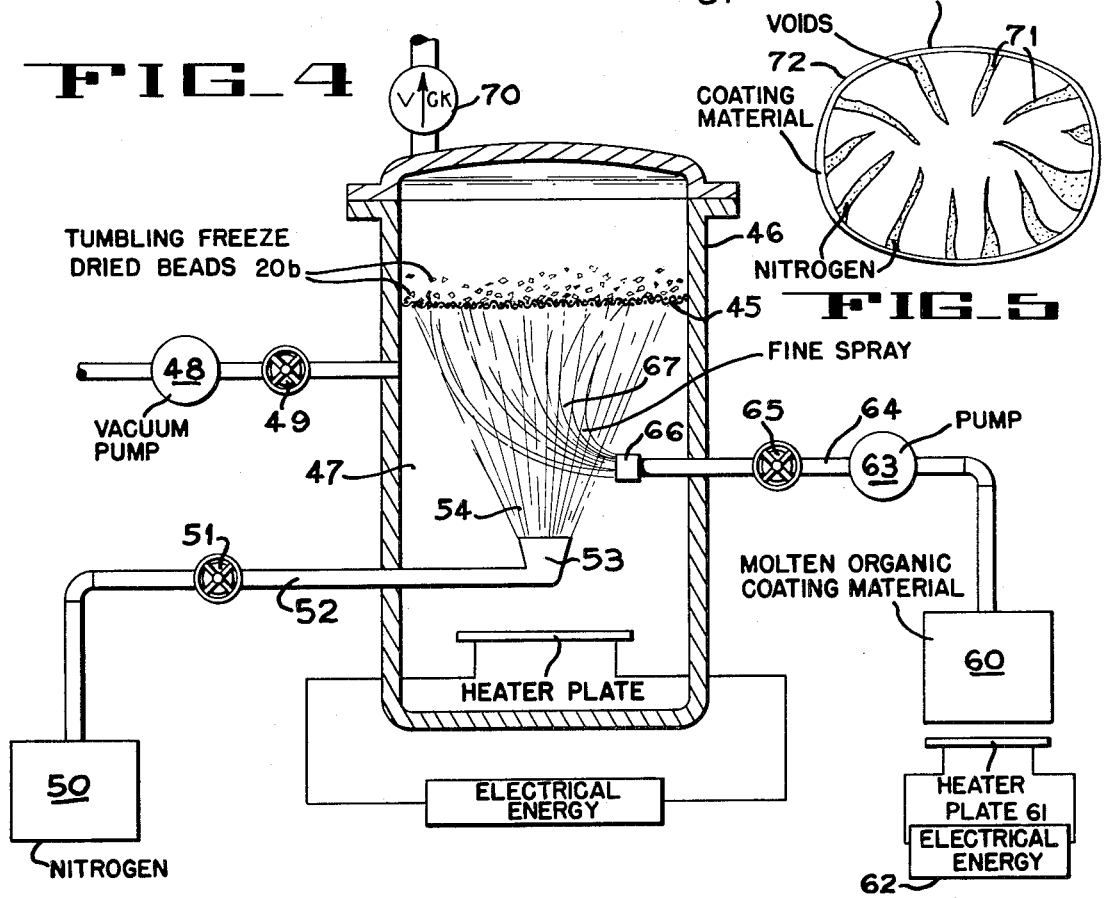

3,672,917
METHOD OF IMPROVING QUALITY AND STORAGE STABILITY OF DEHYDRATED PRODUCTS
Charles M. Buchzik, San Jose, Calif., assignor to
FMC Corporation, San Jose, Calif.
Filed Aug. 15, 1969, Ser. No. 850,583
Int. Cl. A23f 1/06; F26 3/10
U.S. Cl. 99—199                                   10 Claims

ABSTRACT OF THE DISCLOSURE

An aqueous solution of soluble food concentrate is sprayed into chilled hexane or water immiscible liquids to freeze the concentrate into beads. The beads are freeze dried to remove ice therefrom by sublimation in a subatmospheric pressure chamber. The freeze dried beads are sealed in a chamber from which the air is removed. Nitrogen is introduced to the chamber and is heated to pass through a screen which supports the freeze dried beads. The nitrogen enters voids in the beads and is sealed therein by a coating of coconut-oil fat, with or without addition of antioxidants, the coconut-oil fat being sprayed into the chamber and carried to the beads by the stream of warm nitrogen.

BACKGROUND OF THE INVENTION

The present invention relates to the preparation of dehydrated products such as coffee and fruit juices.

A common method of preparing dehydrated products such as food products is by freeze drying. Generally, the freeze dried product consists of small particles which have voids, such as cracks or crevices. One method of preparing a concentrated solution, such as a coffee extract, for freeze drying is to spray droplets of the solution into chilled hexane or other water immiscible liquids to freeze the droplets into beads. The ice is then removed from the beads by sublimation in the freeze drying process to leave beads with small capillary openings. The beads are very light colored, and, because of the openings therein, expose a relatively large area to oxygen in the atmosphere. The same situation is encountered in beaded frozen fruit juice particles and in beaded frozen tea particles prepared in a manner similar to the preparation of the beaded frozen coffee particles.

Freeze dried products have a tendency to become stale rapidly because of oxidation when exposed to the oxygen in the air. In addition, the color of the freeze dried product is frequently not of a commercially accepted hue.

SUMMARY OF THE INVENTION

In accordance with this invention, a coating is applied to a freeze dried product to cover the voids in the product and to seal the voids from oxygen. In the preferred form of the invention, frozen beads of a comestible solution, such as coffee concentrate, are freeze dried. The freeze dried beads are placed on a screen in a chamber from which air is evacuated. A stream of warm nitrogen is introduced into the chamber and directed up through the screen on which the beads are placed. The stream of warm nitrogen agitates the particles, causing them to tumble about on the screen. A spray of a molten organic coating material, such as coconut-oil fat with or without addition of antioxidants, is introduced into the stream of nitrogen and carried thereby to the freeze dried particles.

The nitrogen fills the voids in the particles, the sprayed organic coating material bridges, but does not fill, the voids. By bridging the voids, the coating material seals the nitrogen into the particle interior and seals the oxygen out. The thin layer of coating material which covers the voids alters the surface characteristics and gives a shiny, deep-colored appearance to the particle.

The coated bead constitutes a unique particle of large interior capillary area for quick rehydration, but with the surface sealed with a limited amount of fatty coating. As hot water melts off the coating from the surface of the particle, the water penetrates the particle thoroughly and quickly for quick rehydration. The fatty coating contributes to a superior mouth feel of the reconstituted product.

It is therefore one object of the present invention to provide a process for preparing a freeze dried product, such as coffee, which will not have a tendency to become stale quickly. It is another object of the present invention to provide a process for preparing freeze dried coffee which will have a commercially acceptable hue.

BRIEF DESCRIPTION OF THE DRAWINGS

FIG. 1 is a table showing steps of the preferred form of the process of the present invention;

FIG. 2 is a perspective view, partly in cross-section, of apparatus for preparing frozen beads of coffee;

FIG. 3 is a cross-sectional view in elevation of apparatus for freeze drying the frozen beads of coffee;

FIG. 4 is a cross-sectional view in elevation of apparatus for spraying a coating material on the freeze dried coffee beads; and FIG. 5 is a cross-sectional view of a coated, freeze-dried coffee bead.

DESCRIPTION OF THE PREFERRED EMBODIMENT

There is shown in FIG. 1 the steps to be undertaken in the preferred method of the present invention. In FIG. 2 there is shown a solution 10 of coffee extract which is prepared by extracting soluble solids from roasted coffee to form a concentrated solution containing in the order of from 25 to 30 percent of soluble solids dissolved in water. The invention may also be practiced on a solution of fruit juice, such as orange juice. The preparation of either a coffee liquid concentrate, or a fruit juice liquid concentrate, are well known in the art and need not be described in further detail.

The coffee solution 10 is received in a container 11 which is in communication, through conduit 12, with a source 13 of nitrogen under pressure. Shut-off valve 14 in conduit 12 controls the flow of nitrogen into container 11. A conduit 15 having one end immersed in the coffee solution 10 extends from container 11 and terminates in a spray nozzle 16.

Droplets 20 of coffee solution are ejected from the spray nozzle 16 and fall into the liquid hexane 21 in an inner container 22. Container 22 is received in a Dry Ice acetone bath 23 in outer container 24. Water is not soluble in the hexane which has a sufficiently low freezing point to remain liquid at temperatures at which the droplets will freeze. As the droplets enter the hexane, the droplets freeze in a spherical shape to form beads. A stirrer 25 is utilized to disperse the droplets and disseminate the heat evolved.

The frozen beads are removed from the liquid hexane and placed on a tray 30 (FIG. 3) inside a sealed vessel 31. A vacuum pump 32 can draw a vacuum in chamber 33 through conduit 34 containing shut-off valve 35. A heater plate 36, connected to a source 37 of electrical energy, is mounted beneath tray 30 and, with subatmospheric pressure in the chamber 33, the ice is removed from the frozen beads by sublimation. The sublimed water vapor is condensed on condenser plate 38 through which refrigerant from refrigeration unit 39 passes.

The beads which have been dried by sublimation of the ice therein, that is, freeze dried, are removed from vessel 31 and placed on a fine mesh screen 45 (FIG. 4) in vessel 46. Air can be removed from chamber 47 in vessel 46 by means of vacuum pump 48 which is connected through shut-off valve 49 to vessel 46. Nitrogen from source 50 can be introduced to chamber 47 through shut-off valve 51 by means of conduit 52. Conduit 52 terminates at an upwardly pointed nozzle 53 inside chamber 47 which directs a stream 54 of nitrogen up through screen 45. A source 60 of organic coating material is heated by heater plate 61, which is energized by a source of electrical energy 62. A pump 63 pumps the molten coating material through conduit 64, containing shut-off valve 65, into chamber 47. The conduit 64 terminates inside chamber 47 at spray nozzle 66 which disperses a fine spray 67 of molten coating material, which, preferably, is coconut-oil fat, with or without addition of antioxidants. The spray 67 is caught in nitrogen stream 54 and is carried up to the freeze dried beads which are tumbled on screen 45 by the stream of nitrogen.

In practicing the method of the invention, nitrogen under pressure is introduced to container 11 to force the coffee solution therein through conduit 15 and nozzle 16. The droplets are frozen by the hexane into beads 20a which are removed from the hexane and placed on tray 30. The tray 30 is placed in vessel 31, which is then closed tight. With valve 35 open, vacuum pump 32 is started to draw air from chamber 33.

After the beads are freeze dried, the freeze dried beads (indicated at 20b) are placed on the screen 45 in vessel 46. The vessel is then sealed tight and valve 65 is closed. With valve 49 open, vacuum pump 48 is started to draw air from chamber 47. After the air is evacuated from the chamber, valve 49 is closed and valve 51 is opened. This introduces the stream of nitrogen which is directed up through the freeze dried beads 20b. The valve 65 is then opened to pump a spray of molten organic coating material into the nitrogen stream for elevation to the freeze dried beads which are tumbled on screen 45 by the nitrogen stream. The nitrogen (and the spray not deposited on the beads) pass through check valve 70 to escape from the vessel 46.

The freeze dried beads have voids, or capillary passages, 71 therein as shown in FIG. 5. These voids fill with nitrogen from stream 54 and then are sealed, but not filled, by the coconut-oil fat spray 67 which strikes the tumbling freeze dried beads to form a coating 72 thereon. The coated bead (indicated at 20c in FIG. 5) takes on a shiny, deep-colored appearance which greatly enhances the commercial acceptability of the freeze dried coffee particles. The particles have large interior capillary area for quick rehydration, but with the surface sealed with a limited amount of fatty coating. When the coated particles are added to hot water, the coating melts quickly from the surface to permit water penetration.

The organic coating material has been described as coconut-oil fat. The coating may also be a hydrogenated coconut-oil fat, or a hydrogenated coffee-oil. Alternatively, the coating material may be a mixture of coffee-oil and coffee-bean wax.

The source of nitrogen 50 may contain atomized oils which will coat the interior capillaries 71 of the freeze dried beads. Instead, coffee volatiles (roaster or grinder gas, which is the gas given off during roasting or grinding of the coffee beans) may be mixed with the nitrogen from source 50 to inject the volatiles deep into the capillaries under the fat layer 72. Additionally, or alternatively, synthetic flavor components to replace flavor components (such as methyl mercaptan, dimethyl sulfide) frequently lost, may be mixed with the nitrogen for introduction into the voids of the beads.

Although the best mode contemplated for carrying out the present invention has been herein shown and described, it will be apparent that modification and variation may be made without departing from what is regarded to be the subject matter of the invention.

What is claimed is:

1. The method of treating freeze dried particles comprising the steps of placing said particles in a chamber, sealing said chamber, evacuating the air from said chamber, introducing an inert gas into said chamber, and spraying an edible coating on the particles in said sealed chamber before exposure of the particles to the atmosphere to seal inert gas within the dried particles.

2. The method of claim 1 in which said particles are sprayed with coconut-oil fat.

3. The method of claim 1 in which said particles are sprayed with coffee-oil.

4. The method of claim 1 in which said spraying is effected with a molten spray.

5. The method of claim 4 in which the spray is carried to the particles by an inert gas.

6. The method of treating freeze-dried particles comprising the steps of placing said particles in a chamber, sealing said chamber, evacuating the air from said chamber, directing a stream of inert gas into said chamber and toward said particles, and introducing a spray of coating material into said stream for conveyance to the particles and deposit thereon.

7. The method of claim 6 in which said coating material is a molten edible coating material.

8. The method of claim 7 in which said edible coating is an edible fat and said inert gas is nitrogen.

9. The method of treating freeze-dried particles comprising the steps of placing said particles on a screen in a chamber, sealing said chamber, evacuating the air from said chamber, introducing a stream of inert gas into said chamber directed toward said foraminous member, and introducing a spray of coating material into said stream for conveyance to the particles on the foraminous member.

10. The method of treating-freeze dried particles comprising the steps of placing said particles on a screen in a chamber, sealing said chamber, evacuating the air from said chamber, introducing an upwardly flowing stream of inert gas into said chamber below said foraminous member to tumble the particles on the foraminous member, and introducing a spray of coating material into said upwardly flowing stream of gas in the chamber for conveyance to the particles on the foraminous member.

References Cited

UNITED STATES PATENTS

| | | | |
|---|---|---|---|
| 2,750,998 | 6/1956 | Moore | 99—199 X |
| 2,751,687 | 6/1956 | Colton | 99—71 UX |
| 2,751,762 | 6/1956 | Colton | 99—71 X |
| 3,261,694 | 7/1966 | Forkner | 99—199 |
| 3,266,559 | 8/1966 | Osborne et al. | 99—199 X |
| 3,421,901 | 1/1969 | Mahlmann et al. | 99—71 X |

FOREIGN PATENTS

| | | | |
|---|---|---|---|
| 250,302 | 10/1960 | Australia | 99—199 |

NORMAN YUDKOFF, Primary Examiner

K. VAN WYCH, Assistant Examiner

U.S. Cl. X.R.

99—71